United States Patent [19]

van der Ouderaa

[11] 4,357,658

[45] Nov. 2, 1982

[54] SYSTEM FOR THE ASYNCHRONOUS TRANSPORTING OF DATA BETWEEN ACTIVE FUNCTIONAL UNITS

[75] Inventor: Eduard M. A. M. van der Ouderaa, Eindhoven, Netherlands

[73] Assignee: U.S. Philips Corporation, New York, N.Y.

[21] Appl. No.: 120,410

[22] Filed: Feb. 11, 1980

[30] Foreign Application Priority Data

Feb. 14, 1979 [NL] Netherlands .................. 7901156

[51] Int. Cl.³ .............................................. G06F 1/00
[52] U.S. Cl. .................................................. 364/200
[58] Field of Search ... 364/200 MS File, 900 MS File; 340/147 LP

[56] References Cited

U.S. PATENT DOCUMENTS

3,978,451  8/1976  Ito et al. ................... 340/147 LP
3,988,716  10/1976  Fletcher et al. ................. 364/200
4,030,075  6/1977  Barlow .............................. 364/200

Primary Examiner—Harvey E. Springborn
Attorney, Agent, or Firm—James J. Cannon, Jr.

[57] ABSTRACT

For mutual bidirectional communication, two active functional units are connected by a bidirectional data bus line and one unidirectional control line for each of the two directions. Both active functional units are each time connected, via an output circuit, to the relevant single connections of the data bus line. The output circuits have at least one first state in order to produce per first state, at a low impedance, a first data state on the connection, and one second state for generating, at a high impedance, a second data state for the connection. When such a first and a second data states are simultaneously present on one and the same connection, the former state dominates. The second state can thus also act as an inactive state. A bidirectional data transport cycle for the first active functional unit includes the following steps: supplying data—transmitting a request signal—detecting an acknowledge signal—deactivating the transmitted data—changing over to the receive state—terminating the receive state—transmitting the acknowledge signal.

5 Claims, 12 Drawing Figures

SYSTEM FOR THE ASYNCHRONOUS TRANSPORTING OF DATA BETWEEN ACTIVE FUNCTIONAL UNITS

BACKGROUND OF THE INVENTION

The invention relates in general to a system for communication between two (or more) active functional units, for example, microprocessors or microcomputers. These units are interconnected by means of a data bus line having a data path width of, for example, 8 bits, and furthermore by a number of control-lines. In the case of only two active functional units, the data bus line acts as a single data link. On the other hand, the data bus line, and also the control lines, may be connected to a group of several (more than two) active functional units. A first active functional unit in this group then acts, for example, as a data source (talker), while the other functional units of this group together act as data operating in parallel destinations (listeners). The number of control lines then at least equals three. Thus, all these other active functional units together, however, can be considered to be only a single unit: viewed from the first active functional unit, the communication resembles an interaction between only two active functional units. The invention in particular concerns a device which includes at least two active functional units for the asynchronous transporting of digital data between said functional units by means of an interconnecting bidirectional data bus line together with at least two unidirectional control lines for carrying control signals for controlling data transmission, that is to say a. a request signal in a first direction from a first active functional unit to a second active functional unit;

b. an acknowledge signal in the opposite second direction from the second active functional unit to the first active functional unit;

the first active functional unit comprising a first circuit for instantaneously supplying, together with the generating of said request signal, data to be transported together in the first direction via the data bus line, the second active functional unit comprising a receiver which is connected to the data bus line. A system of this kind is known from the article by K. L. Thurber et al., A systematic aproach to the design of digital bussing structures, Proceedings AFIPS conf. Fall. 1972, pages 719–740, notably page 727, right column, FIG. 17 and the associated text. A request signal of this kind (data ready) is produced by a signal variation, for example, by a transition from a binary "1" to a binary "0" or vice versa. The same is applicable to the acknowledge signal (data accept). The communication system described provides data transport in only one direction.

SUMMARY OF THE INVENTION

The invention has for its object to make a system of this kind suitable for an efficient full duplex traffic in order to make the role of the active functional units alternately that of a transmitter and a receiver, without necessitating an additional control conductor (interrupt conductor) or a waiting interval until the end of a possibly very long message. The object in accordance with the invention is realized in that the second active functional unit comprises a second functional circuit for instantaneously supplying, together with the generating of an acknowledge signal, data which is to be subsequently transported together in the second direction via the data bus line, the first active functional unit comprising a receiver which is connected to the data bus line, each of said first and second circuit comprising for a single connection of said data bus line an output circuit with at least one first state for imposing for each said first state, at a low impedance, a first data state on said connection, and one second state for generating, at a high impedance, a second data state for said connection in order to form, under the control of an acknowledge signal received in the first active functional unit or a request signal received in the second active functional unit, a receive state which starts after a control signal received by the relevant active functional unit via one of said control lines and which ends before the next control signal to be transmitted by this active functional unit via one of said control lines. The two control signals retain their original names referring to the physical control lines. However, they now both operate to control the data transport in the one as well as in the other direction. The request signal indicates that data is ready, but also that previously transported data has been received, so that it need no longer remain available. The full duplex traffic results in more efficient use of the data bus line. The foregoing becomes possible by the high impedance state of said output circuit.

Preferably, said output circuit has only one first state for representing a first binary data value, the second data state representing the second binary data value. This results in an attractive design. On the other hand, "1" and "0" can also both be generated at a low impedance. The transmitted data itself may also have three or even more values.

Preferably, said first and second active functional units comprise a third circuit for supplying data to be transported for a period of time beyond the duration of a receive state, that is to say starting directly before a control signal to be transmitted by the relevant active functional unit via one of said control lines and terminating directly after the next control signal received by the relevant active functional unit via one of said control lines. This results in a very efficient use of the transport capacity of the data bus line: there are alternately time intervals with single active and hence valid data on the data bus line and with mutually overlapping and hence invalid data.

Preferably, for realizing data transport exclusively in said first direction, said third circuit is active exclusively in the first active functional unit, said output circuit in the second active functional unit being continuously in said second state. Given activity steps can thus be omitted in the second active functional unit in order to accelerate the data transport from the first active functional unit. The decision to "skip" the transmission can be taken again, without it being necessary to inform the other active functional unit in advance.

Preferably, for carrying said acknowledge signal there are provided two single second connections as control lines, all second active functional units being connected to said second connections by way of an output of their relevant second circuits, each second connection forming a general acknowledge signal from the acknowledge signals received from the second active functional units, in the manner of a logic gate, in order to form a three-wire synchronization system (three-wire handshaking). Thus, the efficient data transport described above can also be realized in the case of more than one second active functional unit. The logic function is then formed, for example, as an AND-gate. The general acknowledge signal is produced only under the control of the slowest one of the second active functional units, as will be described in detail hereinafter. The data transport can again take place in both directions and again more than one first active functional unit may be present.

Preferably, at least one of the active functional units is formed by a microcomputer. Microcomputers of this kind consist of one or only a few integrated circuits. These microcomputers include elements for performing arithmetical operations, data input/output, read/write memory and read only memory, and control elements. In accordance with the invention, the data transport for such devices can be efficiently performed.

BRIEF DESCRIPTION OF THE FIGURES

The invention will first be described hereinafter with reference to a circuit diagram. Subsequently, a simple embodiment will be completely described. Finally, a description will be given of an implementation by means of two microcomputers. The description will be given with reference to some Figures.

DETAILED DESCRIPTION OF PREFERRED EMBODIMENTS

Figure 1:
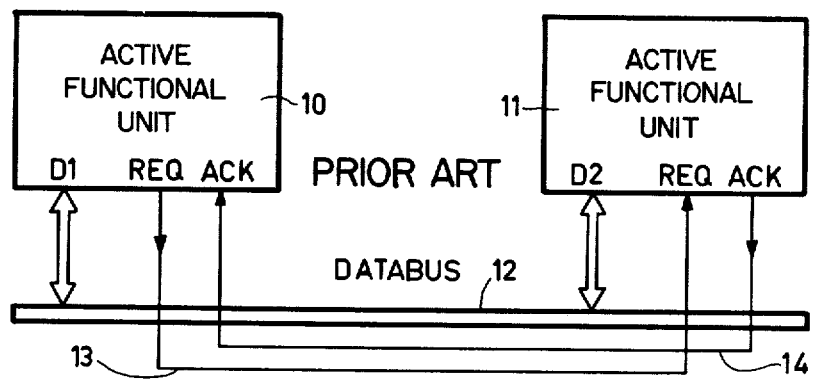
FIG. 1 shows a circuit diagram of an arrangement of two prior art active functional units.

FIG. 1 shows, by way of example, an arrangement of two active functional units 10 and 11, for example, two microprocessors. They are connected by a data bus line 12 which has a data path width of 8 bits. As is indicated, further active functional units may also be connected to this line. With respect to the line 12, the active functional units can act as a data transmitter as well as a data receiver. The devices 10 and 11 are connected by means of a unidirectional request line (REQ) 13 and a unidirectional acknowledge line (ACK) 14 which are only suitable for the transport of control signals in the direction denoted by an arrow. As will become clear, the designation of the lines 13 and 14 is rather arbitrary: these names can be interchanged with respect to the active functional unit 11.

Figure 2:
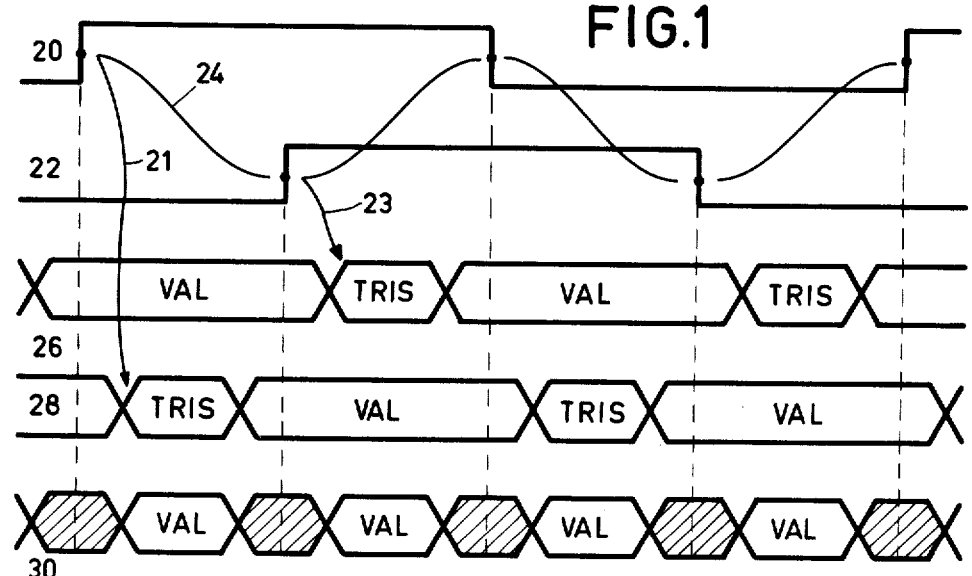
FIG. 2 shows a time diagram of a number of signals in the case of bidirectional transport.

FIG. 2 shows a time diagram of a number of signals in the case of bidirectional transport of data signals, via the data bus line 12, between the active functional units 10 and 11. Line 20 shows the binary signal state on the request line 13, for which the finite lengths of the transitions between the two binary states have been ignored. Line 22 similarly shows the binary signal states on the acknowledge line 14. The meandered line 24 indicates the sequence of the signal transitions to be generated by the relevant active functional units: the device 10 first produces a transition from zero (low) to 1 (high) on the request line 13. This acts as a request signal from the device 10 to the device 11. When the device 11 detects this transition, this device itself produces a transition from 0 to 1 on the acknowledge line 14. This transition thus serves to acknowledge the reception of the earlier request signal. On the other hand, it also acts to extract a further request signal from the device 10. It thus appears that the functions of request signal and acknowledge signal are symmetrical, so that their designation is actually arbitrary. When the device 10 detects the latter transition on the line 14, the device 10 itself produces a transition from 1 to 0 on the request line. The latter transition thus also serves to signal that the earlier acknowledge signal has been received. When the device 1 detects the latter transition, it produces a transition from 1 to 0 on the acknowledge line. When the device 10 detects the latter transition, the cycle has been completed and a next, corresponding cycle may commence. Similarly, the data state (0, 1) may be reversed for one of the two control lines.

Line 26 shows the data state of the active functional unit 10 with respect to the data bus line 12. Before supplying a request signal, the active functional unit 10 first makes the data available, that is to say valid; this signal state is indicated by the interval "VAL." It is only when there is no longer uncertainty (for example, due to "jittering"), that the signal on the line 20 becomes "1," said time relationship being denoted by vertical broken lines. The possible duration of said jittering is indicated by the oblique and crossing transitions on the line 26. The transition on the line 20 is detected in the active functional unit 11 and, when there is no longer uncertainty, the output buffer of the functional unit 11 is activated at this high impedance. This is indicated on line 28 by the letters TRIS. It is assumed that this buffer is a tristate buffer which comprises three states, that is to say "0," "1" and "terminated by a high impedance." During an interval VAL, one of the two first states may prevail, depending on the data to be transmitted. A further realization involving such a high impedance starting state will be described with reference to FIG. 4. The sequence of the occurrences on the lines 20 and 28 is indicated by the arrow 21. When said outout buffer is in the high impedance state (TRIS on line 28), the relevant active functional unit is ready to receive data, which is indicated as VAL on line 30. The line 30 indicates the state of the data bus line 12. The actual writing of the data, for example, into an input register, takes place during this interval VAL and occupies only a comparatively small part thereof; this is not separately shown. After a given period of time, this data has been taken up and the high-impedance state of the output buffer is terminated by the circuits of the active functional unit 11. Subsequently, new data is made available on the data bus line: the data is present, for example, in an output register. This state is indicated on line 28 as "VAL." When uncertainty no longer exists, functional unit 11 produces a signal transition on line 14, which acts as an acknowledge signal: the data produced by the active functional unit 10 is then taken up by the active functional unit 11. Said transition is detected in the active functional unit 10 and, if there is no longer uncertainty, the output buffer of this functional unit is driven in the high impedance state. The causal connection is given by the arrow 23. When the latter buffer is in the high impedance state (TRIS on line 26), the data on the data bus line is valid as input data for the active functional unit 10 (again denoted by VAL on line 30). After a given period of time which is autonomously determined by the circuit of the active functional unit 10, the high impedance state of the output buffer thereof is terminated, so that the data is presented on the data bus line: this data is present, for example, in an output register. This state is denoted by "VAL" on line 26. If there is no longer uncertainty in this respect, the active functional unit 10 produces a signal transition on the line 13. This signal acts as a request signal: the data produced by the active functional unit 11 is then taken up by the active functional unit 10. Subsequently, the second half of the cycle is completed in a corresponding manner. The only difference with respect to the first half consists in the different polarity of the control signals on the lines 13, 14. Time intervals with valid data (VAL) and time intervals with data overlapping, denoted by shading, alternately occur on the data bus line. Therefore, the receiver of data can at all times, i.e. in each half period, assume the function of data transmitter by terminating the high impedance state of the output buffer. According to this set-up, the other active functional unit can accept or ignore the data transported via the data bus line. The actual data may consist of one or more data bits presented in parallel. These bits may also be multi-valent data bits. On the other hand, the data can also be presented with at least partially serial techniques.

Figure 3:
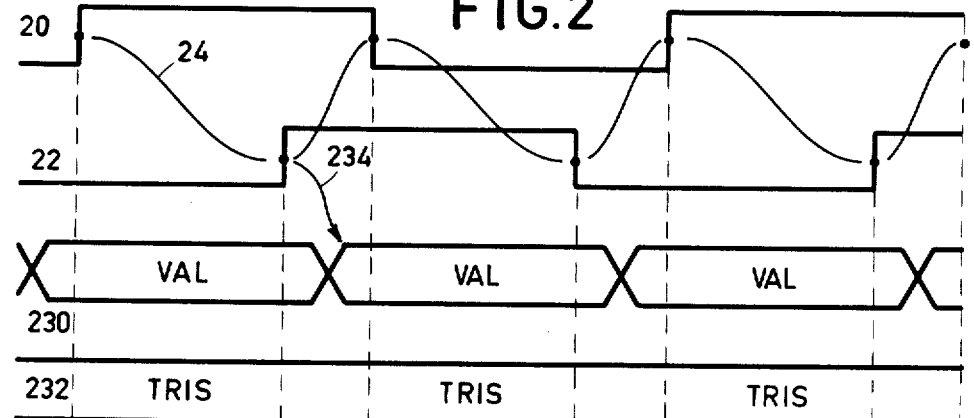
FIG. 3 shows a time diagram of a number of signals in the case of prior art unidirectional transport.

FIG. 3 shows a time diagram of a number of signals in the case of unidirectional transport. The shape of the signals on the lines 20, 22 is the same as that shown in FIG. 2. This is also applicable to the casual connection denoted by the meandered line 24. In accordance with line 230, the first active functional unit again makes data available (VAL) during a period of time which commences shortly before the transmission of a request signal (line 20) and which terminates shortly after the reception of an acknowledge signal (line 22). With respect to the data bus line, the second active functional unit is continuously in the high-impedance state (TRIS on line 232). The take-over instant of the data again is not specifically shown. Taking over is realized after recognition of the request signal and before transmission of the acknowledge signal. Because the second active functional unit 11 does not transmit data, the states VAL on line 230 succeed each other directly. Arrow 234 indicates the causal connection between the reception of an acknowledge signal and the supply of new data by the active functional unit 10. In this embodiment the cycle is shortened because the active functional unit 10 does not assume the receive state, so that only the active functional unit 11 acts as a receiver. The cycle length in FIG. 3 amounts to approximately 70% of that in FIG. 2. However, for each cycle twice the amount of data is transported in FIG. 2. The data transport speeds thus relate as 2/100:1/70=1.4:1, the advantage being for the organization shown in FIG. 2. Thus, in FIG. 3 the efficiency is reduced by less than a factor 2. The connection of an active functional unit to a single connection of the data bus line 12 in FIG. 1 will be described hereinafter. It is assumed that the data is in binary form. A first connection possibility is then formed by a gate having a so-called open collector output. An example in this respect is the module SN 7438 (Texas Instruments) which comprises a two-input NAND gate for four bit lines. When the output transistor thereof is conductive, the output thereof is connected (at a low impedance) to ground. When the output transistor is blocked, the output must be connected at a high impedance, via a leakage resistor, to a positive power supply terminal. When a plurality of output transistors of this kind are connected to a bit line, the potential is determined by one (or more) conductive transistors. The bit line has a high potential only if all transistors are blocked. This implies the already described second impedance state (having, for example, the logic value "1").

Figure 4:
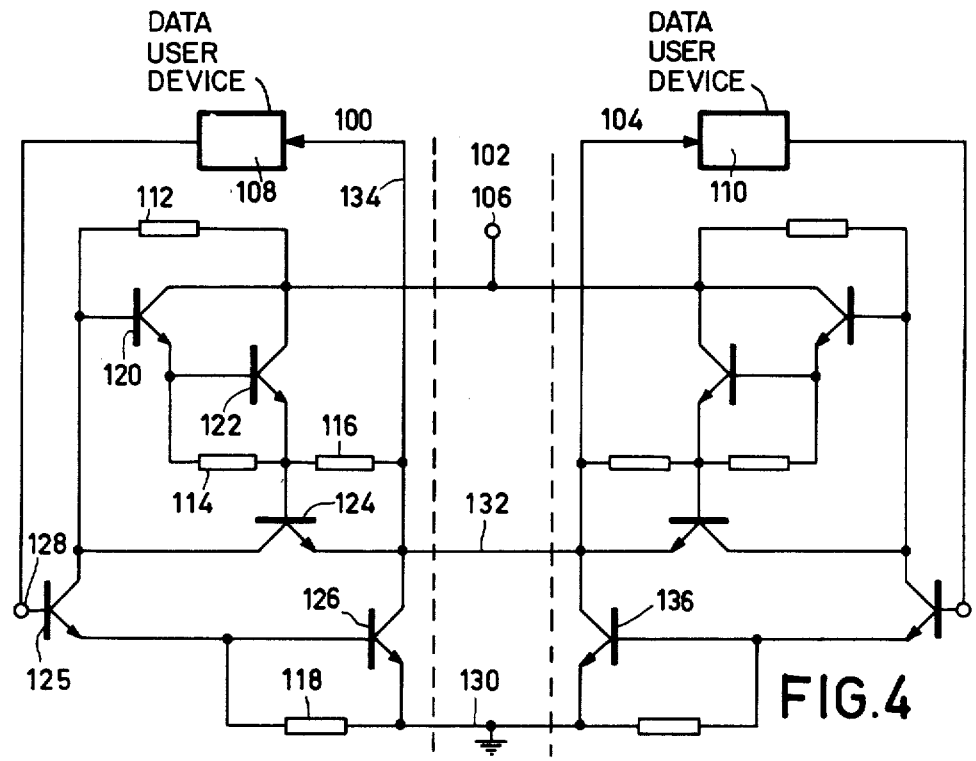
FIG. 4 shows, by way of example, the connection of two active functional units to a one-bit data line.

FIG. 4 shows a further solution which satisfies the requirements. In a general sense, the circuit shows similarity to that disclosed in U.S. Pat. No. 3,597,640 which, however, is intended exclusively as a short circuit-free output stage. Moreover, the present invention proposes the use with the two data states. The section 100 of the circuit comprises a data user 108, comprising a data input line 134 and a data output line which is connected to terminal 128. The unit 108 receives, processes and produces data and is not elaborated herein as such. The remainder of the section 100 forms part of an output buffer stage. Terminal 106 is connected to a voltage source of positive potential (not shown). Line 130 is the common ground line. Line 132 is the actual data line. The right half of the Figure shows the correspondingly constructed station 104.

When the terminal 128 carries a high potential, the transistor 125 is conductive. Via the voltage drop across the resistor 118, the transistor 126 then also becomes conductive. Furthermore, due to the voltage drop across the resistor 112, the transistor 120 is driven by a low voltage (with respect to the collector), so that it is blocked, and so is the transistor 122. The base electrode of the transistor 124 carries the same potential as its emitter, so that this transistor is also blocked. Thus, line 132 is connected to ground via the low resistance of the conductive transistor 126. The blocked transistors 120 and 122 do not supply any substantial further charge from terminal 106 to line 132.

On the other hand, when transistor 125 is blocked by a low potential on terminal 128, the base electrode of transistor 126 is so low that it is blocked. The base electrode of transistor 120 is driven by a comparatively high voltage due to the voltage drop across resistor 112 (Vbe). This transistor thus conducts current. Similarly, transistor 122 remains conductive via the voltage drop across resistor 114. Due to the voltage drop across the resistor 116, the base electrode of transistor 124 carries such a high potential (Vbe) that is conductive. This transistor then operates in a rather linear zone of its characteristic: it operates as a feedback to the control electrode of the transistor 120. The resistors 112 and 114 have a comparatively high value with respect to the resistor 116: the latter conducts, for example, a current of 10 mA and has a value of 0.7/0.01=70 ohms. The transistor 124 then conducts a current of a few tenths of a milliampere. In this state the line 132 is, therefore, connected at a high impedance to the potential of terminal 106 (minus 2 Vbe).

The value of resistor 116 exceeds the resistance exhibited by the transistor 136 in the other station if it were in the conductive state. Therefore, the blocked state of the transistor 126 may signify two things:

(a) Station 100 is in the receive state;

(b) Station 100 is in the transmission state and supplies a logic "1" on the lead 132.

The conductive state of the transistor 126 always implies that the station 100 is in the transmission state and supplies a logic "0" on the line 132. In the arrangement shown in FIG. 4, more than two stations 100, 104 can in principle be connected to the line 132. An upper limit of this number is imposed by the requirement that one single conductive transfer 126/136 must be capable of keeping the potential of the line 132 sufficiently low. The circuit thus satisfies two requirements: each of the stations has at least one comparatively low-impedance state and one comparatively high impedance state. The stations are also resistant against short-circuiting of the line 132 to a low impedance state.

A further solution for the data output device consists in the use of a tristate buffer. An example in this respect is formed by the module SN 74125 (Texas Instruments) which is suitable for four one-bit lines. This module comprises for each bit line two low-impedance states, logic "0" and logic "1," and one high-impedance state. The short-circuit resistance of such modules may be insufficient in some cases, notably during an interval with overlapping data supply (FIG. 2, the shaded parts on line 30). Thus, two different data states can be imposed at a low impedance. If the current then supplied were to become too large, an additional step would be required for current limitation. This can be realized by designs of known means, such as a feedback or a current limiting series resistor.

Figure 5:
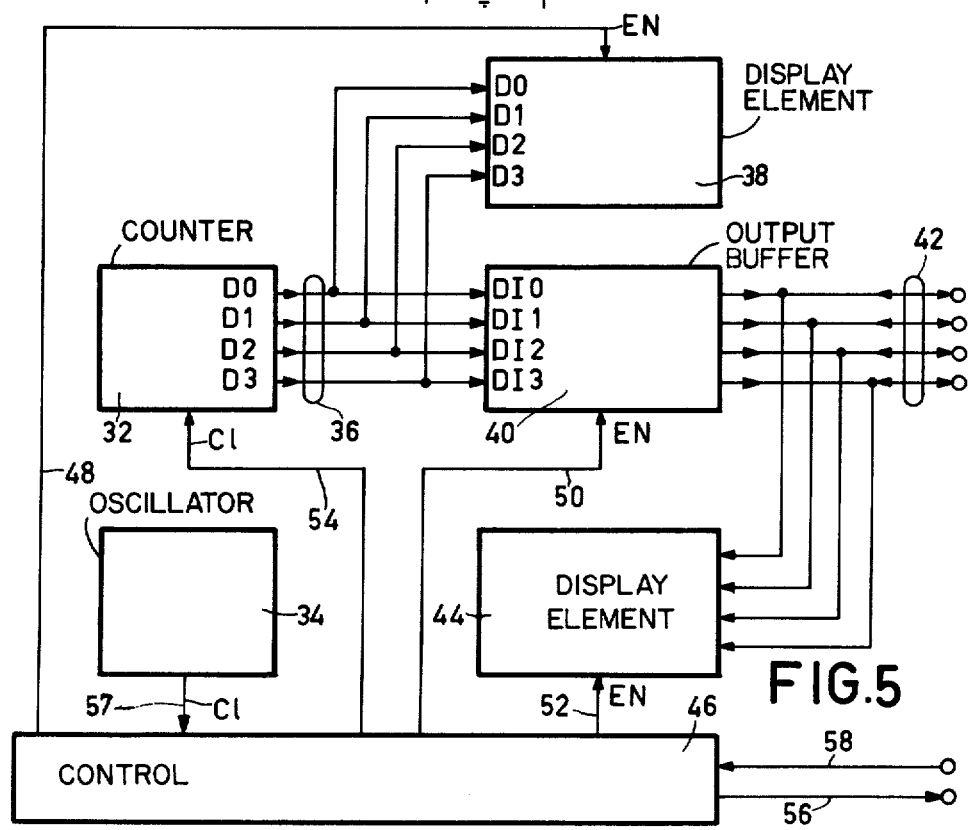
FIG. 5 shows a more detailed block diagram of an elementary embodiment of the invention.

FIG. 5 shows a block diagram of a further realization of an active functional unit. The present embodiment comprises a counter 32 having sixteen positions and a data output with four bit lines 36. Clock pulses on the input C1 each time increment the counter position. The information of the counter position is applied to display element 38 which is capable of displaying a hexadecimal digit. The taking over of the counter position is realized under the control of a suitable signal on the input EN. The information concerning the counter position is furthermore applied to the four-bit output buffer 40 (DI0–DI3). Under the control of a suitable enable signal on input EN of element 40, the data received is conducted to the data bus line 42 which can be active in two directions. The data present on the data bus line 42 is applied to display element 44 which is also capable of displaying a hexadecimal digit. The data received is again taken over under the control of a suitable signal on the input EN of element 44. Thus, the data which is present in the active functional unit and which is to be transmitted and the data most recently received via the data bus are continuously separated. These data can be separately displayed. Element 46 is a control unit which generates said three enable signals on the relevant lines 48, 50, 52. It also receives the clock signals on the input line 57 from the oscillator 34. It also applies increment signals, via line 54, to the counter 32 which is thus incremented by a clock signal. Finally, the control unit generates output control signals on line 56 and receives input control signals on line 58. The latter signals represent the request signals and acknowledge signals which are, therefore, to be connected to a further active functional unit which has been omitted for the sake of simplicity.

Figure 6:
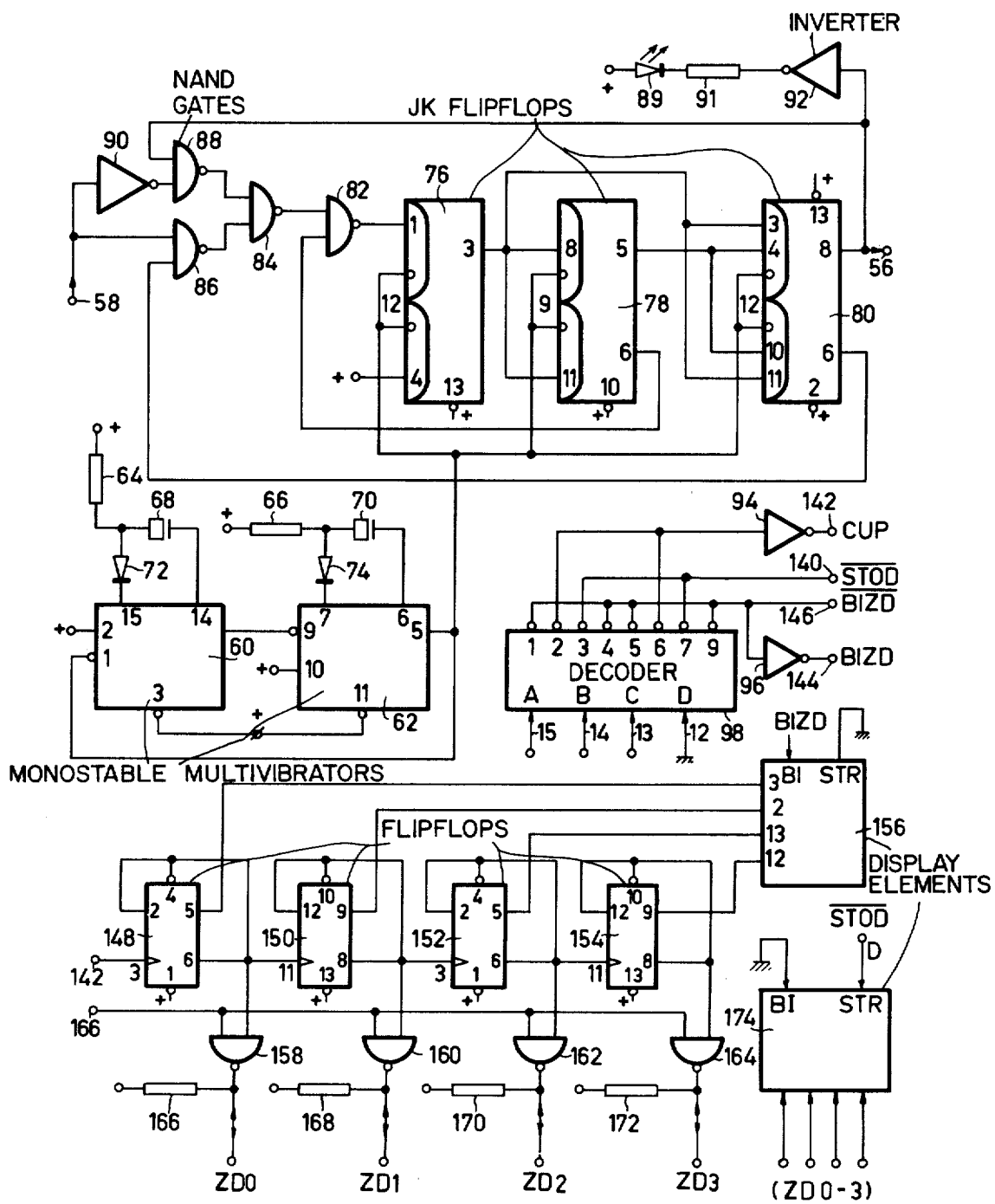
FIG. 6 shows a further elaboration of the embodiment of FIG. 5.

FIG. 6 shows a further elaboration of FIG. 5. The blocks 60 and 62 together form the oscillator 34 and are of the type SN 74123 (Texas Instruments); this module comprises two retriggerable monostable multivibrators. The numbered pins are connected as shown. The astable period is determined in a reproducible manner by addition of resistors 64, 66, electrolytic capacitors 68, 70 and diodes 72, 74. An oscillator is formed by feedback from pin 5 to 1. The frequency can be adjusted by known proportioning of elements 64–70. The terminals denoted by a plus sign are connected to the positive voltage. The output pulses (terminal 5) of the oscillator control an (auxiliary) counter. This counter comprises three JK flipflops 76, 78, 80 (master/slave type). The elements 76, 78 together form a module of the type SN 74107 (Texas Instruments). When the flipflops 76, 78, 80 are all in the "0" state and input 58 receives a logic "1," the auxiliary counter stops (gate 88 supplies a "1," gate 86 supplies a "0," gate 84 supplies a "1" and gate 82 supplies a "0"). When input 58 becomes logic "0," the output signals of the gates 86, 84 and 82 change. The flipflop 76 then toggles in reaction to the next clock pulse and the flipflop states become: 100. In a reaction to the next clock pulse, the flipflops 76 and 78 toggle and the flipflop states become 010. In reaction to the next clock pulse, flipflop 76 toggles and the states become 110. In reaction to the fourth clock pulse, flipflops 76, 78 and 80 all toggle and the positions become 001. Flipflop 80 is a JK flipflop of the type SN 7472 (Texas Instruments) which forms a logic AND-function of the input signals. Pins 5 and 9 (not shown) of element 80 carry a signal "1." This flipflip, therefore, toggles each time when the flipflops 76 and 78 are both in the "1" state. The signal on output 8 of flipflop 80 forms the request signal on line 56 in FIG. 5. The logic NAND-gates 82 to 88 together form a module of the type SN 7400 (Texas Instruments). The inverters 90 to 96 together form part of a module of the type SN 7404 (Texas Instruments). The acknowledge line 58 of FIG. 5 is connected to the inputs of the elements 90 and 86. The elements 84 to 90 realize an EXCLUSIVE-OR function betweeen the signals on the lines 56 and 58: when this function has the value "0," the counter of the elements 76 and 78 can continue counting until the flipflop 80 changes its state, so that the output signal of the gate 84 becomes logic "0." The counting of the counter is determined exclusively by the output pulse of the element 62. The information concerning the states of the flipflops 76, 78, 80 (outputs 3, 5, 8) is also applied to the relevant input terminals 15, 14, 13 of element 98. This is a module of the type SN 7442 (Texas Instruments) which acts as a decoder which receives the binary coded number 0 to 7 and decodes these numbers to eight output lines. This decoder supplies the acknowledge signals and increment signals for the counter 32 shown in FIG. 5, thus forming an output stage of the control unit 46. Via an inverter 94, the outputs 2 and 6 form the signal CUP (counter up) on the terminal 142 which increments the main counter (32 in FIG. 5) by one step. Via terminal 140, the outputs 3 and 7 form the signal $\overline{STOD}$ which activates the display element 44 for the display of the data received via the data bus line. The outputs 1, 4, 5 and 9 are connected to terminal 146 in order to supply the signal $\overline{BIZD}$ and, via the inverter 96, to terminal 144 in order to supply the signal BIZD (blanking input transmission display): the display element 38 is thus activated to display data to be transmitted. The inverted value $\overline{BIZD}$ thereof ensures that the output buffer 40 in FIG. 5 conducts.

The main counter 32 comprises the elements 148 to 154 and is activaed by the signals CUP on terminal 142. The pairs of elements 148/150 and 152/154 each time form a module of the type SN 7474 (Texas Instruments). These four flipflops thus form a sixteen-counter. The output data is applied to display element 156. This is a module of the type TIL 311 (Texas Instruments) which comprises inputs which include a trigger circuit. The output data of the main counter is also applied, in inverted form, to the four NAND-gates 158 to 164. These gates together form a module of the type SN 7438 (Texas Instruments) which comprises four two-input NAND buffer elements with open collector outputs. These elements are controlled together by the described signal $\overline{BIZD}$ on the terminal 146. When this signal has the value "0," the outputs of the NAND-gates are at a high potential via the (internal) resistances 166 to 172 connected to this high potential. The four outputs form the data bus line 42 of FIG. 5. This data bus line ZDO-3 is also connected to data inputs of display element 174 which corresponds to the element 44 of FIG. 5. This is again a module of the type TIL 311 (Texas Instruments). The taking up of data is controlled by the signal $\overline{STOD}$ (terminal 140). The two display elements 156, 174 are thus filled with the data to be transmitted in the one direction or transmitted in the other direction. Element 92 is an inverter which activates the light emitting element (LED) 89 via resistor 91. The signal state of the line 56 can thus be signalled.

This embodiment involves only the use of two active functional units. The second unit is almost identical to the first unit. Functionally only the interchanging of the lines 56 and 58 is of significance, so that now the Exclusive-OR function is formed of the signal on the line 56 and the state of the flipflop 80. The clock frequencies in the two active functional units may be quite different. In this elementary embodiment, the internal counters (elements 148-154) are alternately incremented, after which the incremented counter position is transmitted. There is no relationship between the counter positions in the one and those in the other active functional unit.

Figure 7A:
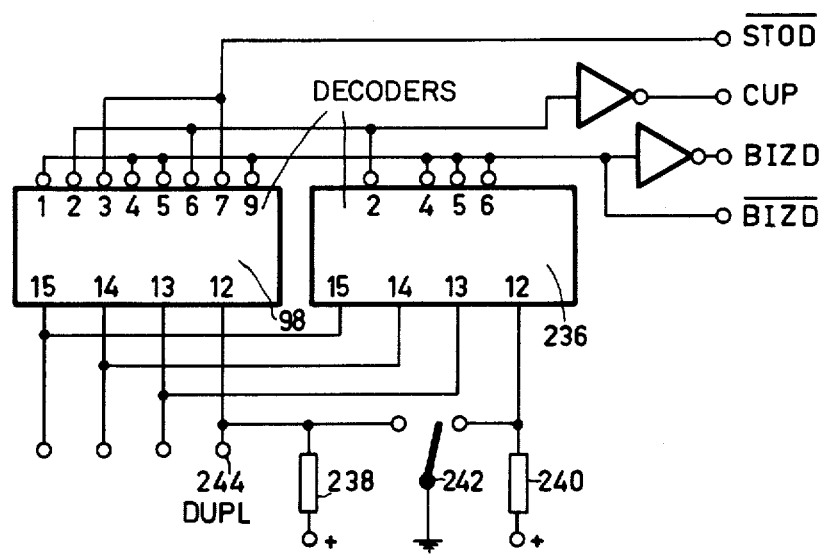
FIGS. 7a, 7b show some modifications to the embodiment of FIG. 6 for data transfer.

FIG. 7 shows the modifications required for realizing data transport in two directions (FIG. 2) and only one direction (FIG. 3), as desired. FIG. 7a shows the modification to FIG. 6. Added are second decoder 236 of the same type as the element 98, a selector switch 242 and two resistors 238, 240. In the case of bidirectional transport, the switch 242 is in the left position, so that the signal DUPL on terminal 244 corresponds to ground level; element 98 is then operational. In element 236, terminal 12 is than at a positive potential, so that mainly invalid codes are received. In this respect reference is made to the manufacturer's (SN 7442 ) (Texas Instruments) specification. In the case of unidirectional transport, switch 242 is in the right position and the element 236 is operational. The signal CUP is thus formed in the same way. The signal BIZD is formed by three successive states (terminals 4, 5, 6) so its duration is slightly longer. The signal $\overline{STOD}$ is not formed. The relevant station thus acts exclusively as a data transmitter.

Figure 7B:
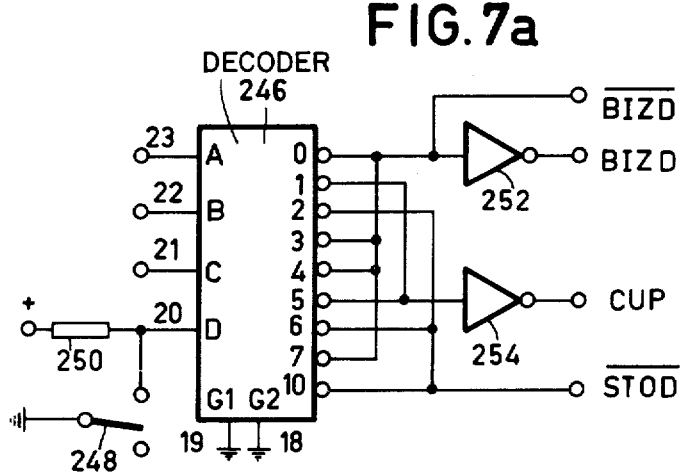

FIG. 7b shows the corresponding modification in the data receiver. Instead of the element 98 there is provided a module 246 of the type SN 54154 (Texas Instruments) which is formed by a decoder for a four-bit code to 16 lines. In bidirectional operation, switch 248 is in the upper position and signal D is at ground level. The output terminals 0-7 then act in the same way as in the element 98. Via inverters 252, 254, the four signals CUP, $\overline{STOD}$, BIZD and $\overline{BIZD}$ are formed. For unidirectional operation, the switch 248 is in the lower position, so that the signal D continuously has the value "1." The input data thus successively assumes only the values 8-15 and only the signal $\overline{STOD}$ becomes active.

The counter position is not incremented and no data is transmitted. As the element 236 supplies the signal CUP only once per cycle (element 98 twice), the element 246 supplies the signal $\overline{STOD}$ also only once per cycle. The data to be transmitted in the above cases can be produced in a variety of ways, for example, also by the repeated addressing of a first-in first-out buffer (FIFO).

Figure 8:
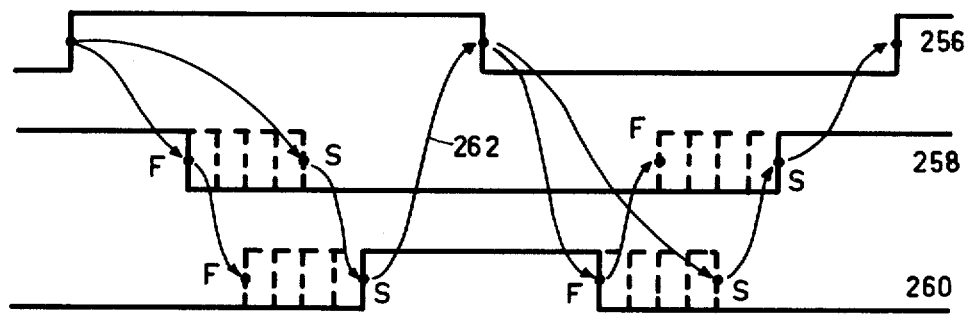
FIG. 8 shows a signal diagram in the case of a several active functional units.

FIG. 8 shows a signal diagram in the case of a plurality of active functional units, i.e. one transmtter and a number of receivers which, for example, return (echo) the data received in unmodified form for test purposes. Line 256 shows the request signals from the first active functional unit. Lines 258-260 show the acknowledge signals from the other active functional units. The latter units each time transmit a first and a second acknowledge signal on two single connections. It is assumed that said two single connections form a logic AND-function. The first active functional unit can receive a "1" only if all acknowledge signals have the value "1". The second active funtional units may be connected to the control lines via a buffer stage comprising an open collector output. They may also have a different response time. This is indicated in the Figure by the letters F (fast) and S (slow). Each second active functional unit supplies two acknowledge signals in opposite directions, so initially a negative-going edge on line 258 and subsequently a positive-going edge on line 260. A general acknowledge signal is formed from the partial acknowledge signal only when the last one of the positive-going edges is present. This general acknowledge signal activates (arrow 262) the first active functional unit to produce a next request signal. Subsequently, the second active functional units produce a negative-going edge on the line 260 and subsequently a positive-going edge on the line 258. Only the last positive-going signal (the other ones are denoted by broken lines) on the line 258 produces the general acknowledge signal. The formation of such an acknowledge signal thus requires three control lines which signal from and to (2×) the first active functional unit. For each second active functional unit the acknowledge signals can be generated simultaneously or successively as shown in FIG. 8. The synchronization of data transmission by means of three control lines is defind per se in IEEE Standard 488-1975, Digital interface for programmable instruments, The IEEE Inc; 345 East 47th St. New York (N.Y.). Even if the data signals returned by way of echo are combined in an AND-gate, they can thus be checked in one operation.

Figure 9:
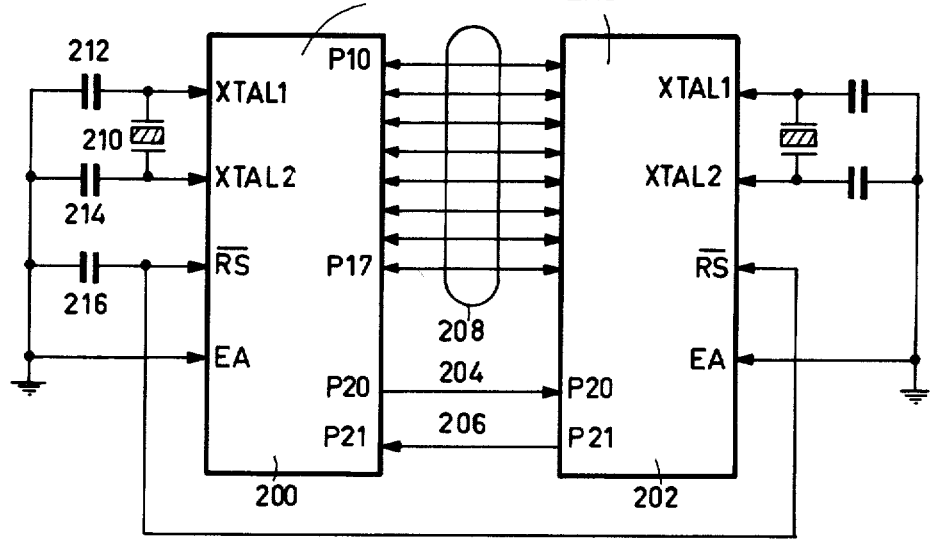
FIG. 9 shows an implementation of the invention with two microcomputers.

FIG. 9 shows an implementation involving two microcomputers of the type INTEL 8048 which are described in the book "MCS -48" microcomputer user's manual, Intel Corporation, November 1976, notably on pages 6-1 to 6-5. According to the manufacturer, pin 8 is the "read" pin ($\overline{RD}$) and pin 10 is the "write" pin ($\overline{WR}$). The element 200 represents such a microcomputer. A crystal 210 is connected between terminals XTAL 1 and XTAL 2 and determines the clock frequency. These two terminals are connected to ground via capacitors 212 and 214. The terminal EA is inactive due to grounding. The terminal $\overline{RS}$ is inactive due to a capacitor (216) coupling to ground. A reset operation can be realized by briefly connecting this terminal to a low potential. Also present is an 8-bit data bus line 208 which is connected to terminals P10-P17 which together form a gate (port) 1. A request line 204 is connected to terminal P20 and an acknowledge line 206 is connected to terminal P21. The latter terminals form part of the gate (port) 2. The second microcomputer is connected in an almost identical manner, be it that the input $\overline{RS}$ is directly connected to that of the element 200. The terminals $\overline{RS}$, EA are inactive in the normal operating condition.

In accordance with the communication diagram, the output activation elements of the microcomputers are regularly activated at a high impedance. This can be realized by applying a bit pattern "11111111" to gate 1 of the relevant microprocessor. The internal activation elements of the microcomputers are of the open collector type. Moreover, the output line is connected to the positive voltage via an additional transistor, so that the output line can be quickly loaded by an additional control pulse applied to the base of this transistor. After reception of a reset signal, all lines are in the high impedance state. When one of the two active functional units is then read, logic "1" is produced.

Figure 10A:
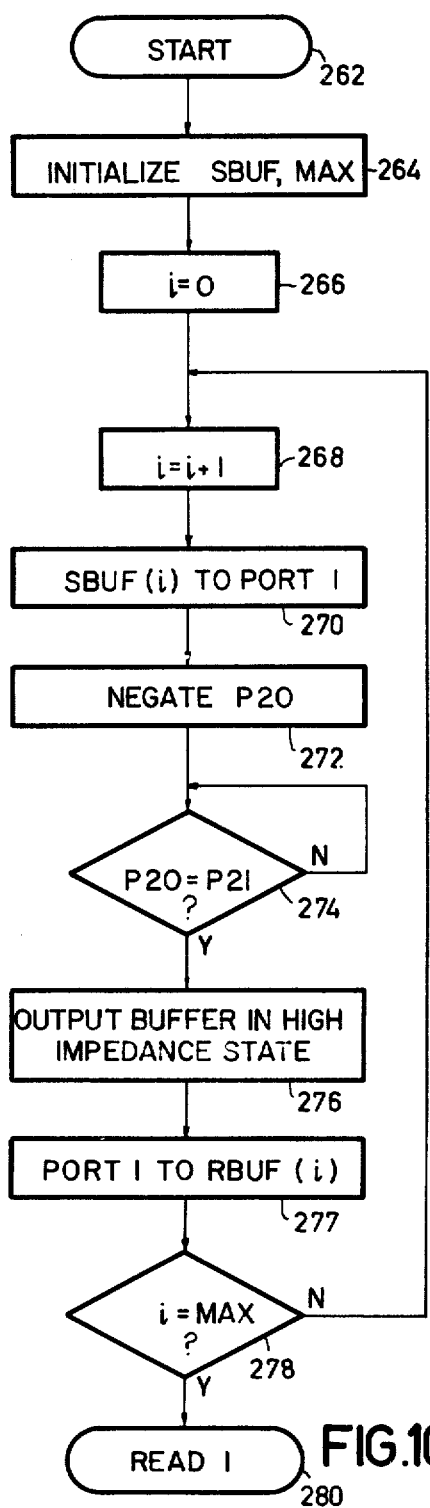
FIGS. 10a, 10b show two relevant flow diagrams for the embodiment of FIG. 9.
Figure 10B:
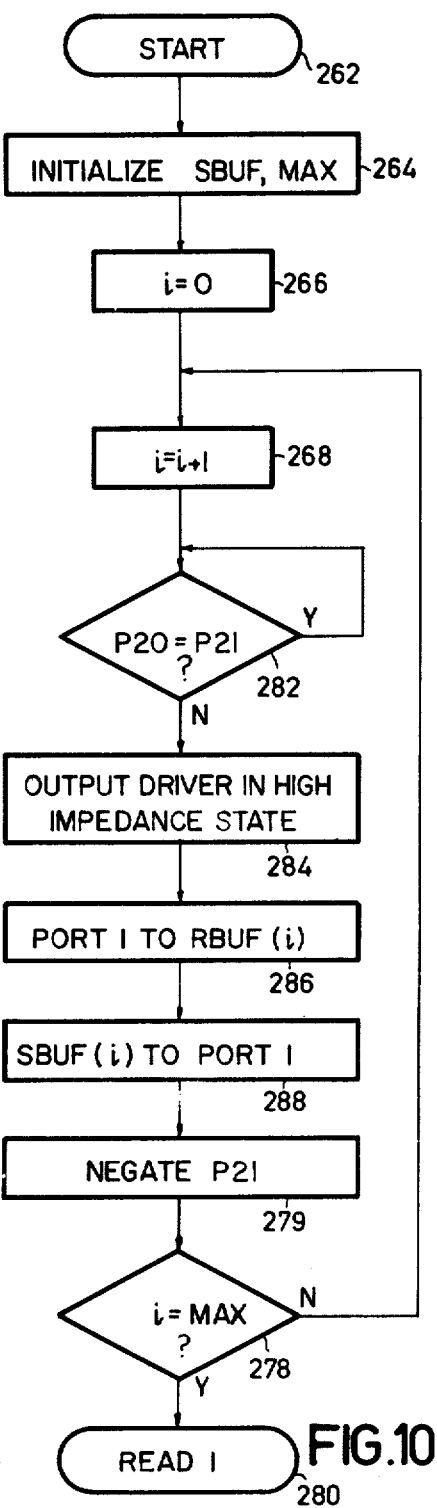

In this respect, FIGS. 10a, 10b show the flow diagrams applicable to the microcomputers 200 and 202, respectively. Block 262 represents the starting condition (START). This condition arises, for example, due to the application of the power supply voltage. In block 264, the output or write buffer is initiated, that is to say filled with the data to be transmitted (these buffers may thus have an arbitrary content). The capacity of SBUF amounts to a number of memory words. Moreover, one of the registers of the arithmetic unit is filled with a predetermined value MAX (INITIALIZE SBUF, MAX). The value of MAX indicates the number of words to be transmitted. In block 266, the value of a variable i is made equal to zero (i:=0). Subsequently, a loop is complete in each of the two microcomputers. In block 268, the value of i is incremented by 1 (i:=i+1). In block 270, the value of i is used as a memory address for SBUF, and the relevant location thereof is read and validated, by means of the output circuits, for port 1 (SBUF (i) TO PORT 1). In block 272, the data on terminal P20 is inverted (NEGATE P20). In block 274, it is detected whether the data on the terminals P20 and P21 is identical (P20=P21?). Initially, they will not be identical (N) and the system will start to operate in a waiting loop. When suitable steps are taken, a predetermined length can be imparted to this loop, but this is not indicated. If correspondence exists (Y), which will be the case after some time, the system leaves the waiting loop. In block 276, the output activation device of port 1 is activated in the high impedance state (OUTPUT DRIVER IN HIGH IMPEDANCE STATE). In block 277, the data then present on port 1 (originating from the other microcomputer) is written, via the write buffer, in the memory location whose address equals i (PORT 1 TO RBUF (i)). Like SBUF, RBUF also has a capacity of a number of memory words. In block 278, it is checked whether the value of i equals the value MAX (i=MAX?). Initially, this will not be the case (N), so that the system proceeds to block 268. After the main loop has been completed a number of times, this correspondence, however, may occur (Y). The system then proceeds to block 280: READY.

For the second microcomputer, the steps are almost identical; only their sequence is different. Furthermore, the value of MAX is the same for both microcomputers. In block 282 it is checked whether the signal on terminal P20 equals that on terminal P21 (P20=P21?). Initially, this will be the case due to the initializing, or due to an action of the relevant microcomputer itself (Y). The system then adopts a waiting cycle. After some time, the correspondence may cease (N) in that the other computer has been in block 272 (and subsequently adopts its own waiting cycle). The content of block 284 corresponds to that of block 276. Block 286 has the same content as block 277. The content of clock 288 corresponds to that of block 270. The content of block 279 corresponds to that of block 272; thus, the signals on the terminals P20 and P21 are subsequently equal and the first microcomputer may abandon its waiting loop. The blocks 278, 280 have already been described. The two microcomputers functionally exchange the content of their memories from the address 1 to address (MAX). When they both have the same value of MAX, they both reach block 280. The microcomputers, of course, can perform other tasks in addition to the described communication processes.

What is claimed is:

1. A device comprising:
   at least a first and a second active functional unit;
   said functional units interconnected by a data bus line having a plurality of parallel single-bit data lines, and by a first single-bit control line for communicating request signal transitions produced by a first transition generator from the first active functional unit to the second active functional unit, and by a second single-bit control line for communicating acknowledge signal transitions produced by a second transition generator from the second active functional unit to the first active funcional unit;
   each functional unit being connected to each single-bit data line both via one data receiver and via one output circuit per single-bit data line, said output circuit having at least:
   one first state for imposing a respective first data value at a low impedance on the data bit line connected thereto and having furthermore one second state for forming a second data value at a high impedance on the data bit line connected thereto;
   wherein furthermore said first active functional unit has first cycling means for supplying in a first operational mode a plurality of data bits on said data bus before generation of a request signal transition and upon reception of a subsequent acknowledge signal transition driving the output circuits of the first active functional unit exclusively to their second states for enabling the data receivers of the first active functional unit;
   and wherein furthermore said second active functional unit has second cycling means for supplying in a second operational mode a plurality of data bits on said data bus before generation of an acknowledge signal transition and upon reception of a subsequent request signal transition driving the output circuits of the second active functional unit exclusively to their second states for enabling the data receivers of the second active functional units.

2. A device as claimed in claim 1, wherein furthermore said first cycling means have a third operational mode for supplying a plurality of data bits on said data bus before generation of a request signal and upon reception of a subsequent acknowledge signal supplying a next plurality of data bits, and wherein said second cycling means have a fourth operational mode for continuously driving the output circuits of the second active functional unit to their second states for enabling the data receivers of the second active functional units.

3. A device as claimed in claim 1 or 2, wherein said output circuits have only one first state for representing a first binary data value, the second state of said output circuits representing the second binary data value.

4. A device as claimed in claim 2 wherein at least two second active functional units are present, and wherein furthermore a third single-bit control line is present for communicating in said fourth operational mode further acknowledge signal transitions from the second active functional units as produced by respective third transition generators therein to the first active functional unit, and wherein said second and third control lines produce a wired logic function from the acknowledge signals received thereon, thereby realizing a three-wire handshake.

5. A device as claimed in claim 1 or 2, wherein at least one of the active functional units is a microcomputer.

* * * * *